Feb. 20, 1968   J. O. HRUBY, JR   3,369,758
LIQUID DISCHARGE DEVICE
Filed June 8, 1965
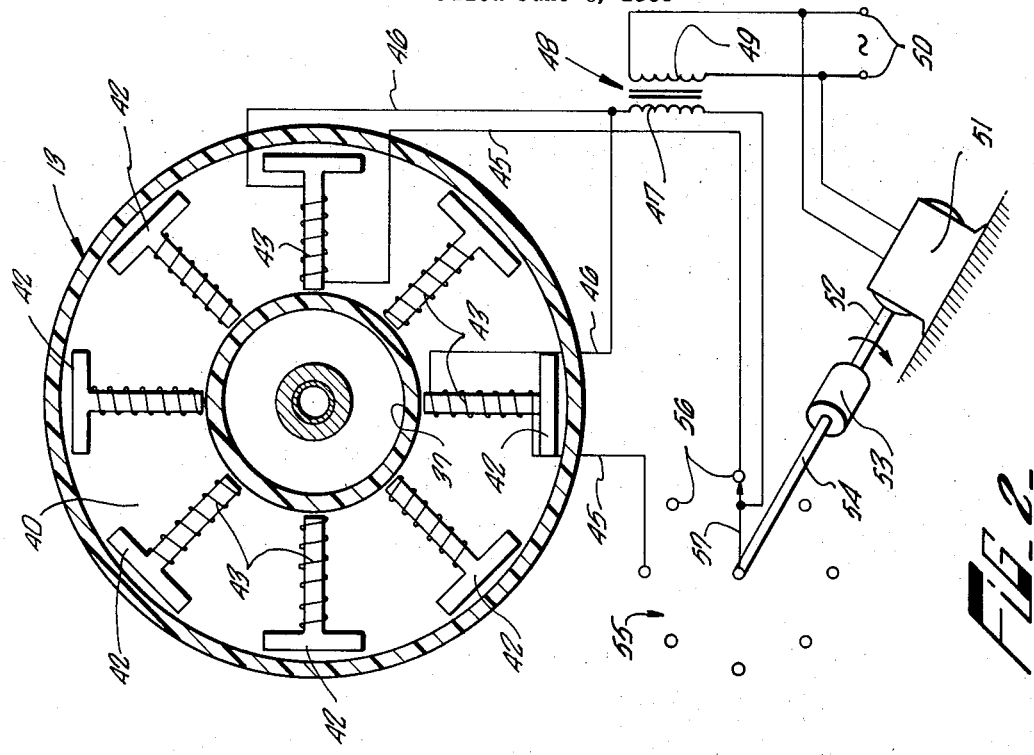
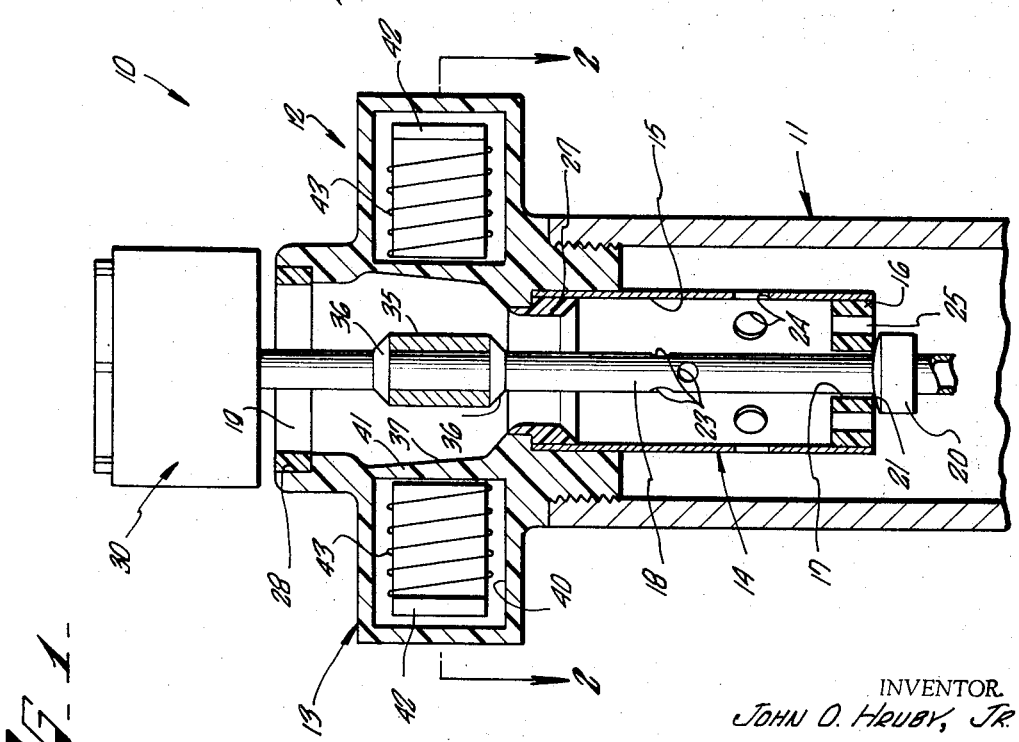
INVENTOR.
JOHN O. HRUBY, JR.
BY
Christie, Parker & Hale
ATTORNEYS.

United States Patent Office 3,369,758
Patented Feb. 20, 1968

3,369,758
LIQUID DISCHARGE DEVICE
John O. Hruby, Jr., Burbank, Calif., assignor to Rain Jet Corporation, Burbank, Calif., a corporation of California
Filed June 8, 1965, Ser. No. 462,213
8 Claims. (Cl. 239—380)

ABSTRACT OF THE DISCLOSURE

A liquid discharge device arranged to discharge liquid droplets of substantial size in comparison to the size of atomized liquid droplets and preferably of the type illustrated in United States Patent 3,081,036, for example, in which the device is of sufficiently large size that viscous shear forces of liquid handled by the device are insufficient in magnitude to produce gyration of a pendulously mounted stem within a hollow tubular body and in which stem drive means are coupled between the stem and the body at a point along the stem remote from a point of pivotal mounting of the stem to the body, the stem drive means being effective to move the stem in a circular path at a rate below that which produces significant vibration in the stem. The stem drive means is arranged so that the only effect of its operation upon liquid flowing through the device is that effect produced by gyration of the stem within the body.

---

This invention relates to liquid discharge devices and, more particularly, to devices useful as spray nozzles in garden sprinkling systems, fire nozzles, and fountain heads, among other applications.

My prior United States Patents 2,589,942 and 2,639,191 describe water discharge nozzles of the general type upon which the improvements of the present invention proceed. The devices described in the above-mentioned patents are characterized by a tubular body through which liquid flows to an open discharge end of the body. An elongated stem is disposed in the body and extends from the body discharge end. The stem is loosely journalled in the body so that it is freely pivotable about a fulcrum point lying within the length of the body. Preferably, the fulcrum point of the stem lies on the axis of the body. The stem is so mounted that it is secured from movement out of the open end of the body. At least one annular bearing, through which the stem extends, is carried by the body at a location spaced from the fulcrum point. The bearing has an inner diameter greater than the diameter of the journal at the fulcrum point. When the device is operated by supplying water or some other liquid to it, the liquid is caused to flow spirally around and along the stem. Such a liquid flow pattern around and along the stem causes the stem to gyrate, or pivot and revolve, about the fulcrum point. The portion of the stem at the open end of the body thus moves rapidly around the outlet opening to break-up into discrete drops the stream of water which passes between the stem and the body. The stem functions as a gyrating pendulum as these devices are operated. The stem may be pivoted either at the outlet end of the body as shown in my prior United States Patent 2,909,326, or at a point along the body spaced from the outlet as shown in Patent 2,589,942.

Devices like those disclosed in patents 2,589,942 and 2,639,191 have the further common feature that the pendulum or stem is caused to gyrate about its fulcrum point, between limits defined by the annular bearing, solely in response to the action of the liquid flowing through the device. The viscosity of the water flowing through the device is relied upon to produce tangential shear forces on the stem. These shear forces are unbalanced and cause the stem to pivot about its fulcrum point. It has been found, however, that when devices configured in accord with the disclosures of either of these two patents is provided for use with large fluid flow rates at relatively low pressures, the gyrating pendulum action is not effectively obtained. This is the situation where such devices are provided for use with large diameter water supply ducts, for example. In such cases, the viscosity of the water flowing through the device is not sufficient to impart sufficient shearing forces to the stem to overcome the weight of the stem and any other structure mounted to the stem. Large devices of this character are useful in fire nozzles and in large ornamental fountain heads generally similar to the fountain head disclosed in my prior Patent 3,081,036, for example. The gyrating pendulum action of the stem is especially desired in ornamental fountains in order that water emerge from the device in discrete drops rather than as a continuous stream of water, or as aerated droplets.

This invention provides simple, effective, and efficient apparatus for causing the stem of a device generally in accord with either or both of Patents 2,589,942 and 2,639,191, for example, to gyrate about its fulcrum point independent of any action on the stem of the water flowing through the device. Such apparatus may be used to provide the sole source of the gyratory motion of the pendulum, or it can be used to supplement the viscous shear forces described above. The apparatus is effective to produce the desired discharge characteristic regardless of the size of the device in which it is used and regardless of the viscosity of the liquid flowing through the device.

Generally speaking, this invention provides a liquid discharge device which includes a tubular body adapted adjacent one end thereof for connection to a liquid supply duct. One end of the body is open for the discharge of liquid introduced into the body. A stem is arranged longitudinally in the body and extends from the open end of the body and within the body away from the open end. Means are provided for supporting the stem relative to the body at a first location within the length of the body so that the stem is freely pivotal about this location. Annular bearing means are disposed in the body and are spaced from the stem supporting means for defining the limits of the pivotal movement of the stem. A device according to this invention further includes means operatively coupled to the stem at a second location spaced along the stem from the first location; this means is operable for moving the stem at the second location of the stem in a circular path so that the stem is caused to gyrate within the body. The operatively coupled means is effective to produce stem gyration independent of the action on the stem of any liquid flowing through the body.

The above mentioned and other features of this invention are more fully set forth in the following detailed description of the invention taken in conjunction with the accompanying drawings wherein:

FIG. 1 is a cross-sectional elevation view of a fountain head according to this invention; and FIG. 2 is a cross-sectional plan view taken along line 2—2 of FIG. 1 in combination with a semi-schematic diagram of the electrical system provided in a presently preferred embodiment of this invention.

FIGURE 1 shows a fountain head 10 threadably connected to the upper end of a water supply duct 11 which extends upwardly from the bottom of a splash or reflecting pool (not shown) of a fountain or the like. The fountain head includes a generally tubular body 12 comprised of an annular stator housing 13 secured to the upper end of the water supply conduit, and of a hollow sleeve 14 extending downwardly from the stator housing within and in spaced relation to the interior of the water supply duct. Preferably at least the stator housing is fabricated from a hard plastic such as polyvinyl chloride, polypropylene, acrylonitrile-butadiene-styrene (ABS resin), or acetal resins derived by polymerization of formaldehyde. Sleeve 14 may be fabricated of brass or some other corrosion-resistant metal if desired. The stator housing and sleeve 14 cooperate to define a water flow passage 15 through the body.

A plug 16 is disposed in the lower end of sleeve 14 and preferably is fabricated of phenol formaldehyde resin. A hole 17 is formed through the plug coaxially of the axis of body 12. An elongate cylindrical stem 18 is disposed in the body and extends from end to end of the body through plug aperture 17 to a lower end disposed below the plug. The stem has an upper end above a liquid discharge opening 19 defined by passage 15 at the upper end of the body. The stem has a diameter smaller than the diameter of aperture 17 so that the stem is loosely journalled in plug 16. The stem below the plug carries a thrust bearing collar 20 having a partispherical upper surface 21. The thrust bearing collar preferably is fabricated of phenol formaldehyde resin or some other material which has a low coefficient of sliding friction relative to the plug in the presence of water. As shown, the stem may be hollow at least over the lower half of its extent, or it may be solid along its entire length as shown in Patent 2,589,942, or it may be hollow along its entire length. Above plug 16 the stem defines a plurality of openings 23 through it so that water entering the lower end of the stem passes from the stem into passage 15. Further, sleeve 14 between plug 16 and the lower end of the stator housing defines a plurality of openings 24 and plug 16 has additional openings 25 formed through it. Openings 24 and 25 further facilitate the passage of water from the liquid supply duct into the interior of the body. It is preferred that the communication from the interior of the liquid supply duct to the interior of the body be as great as possible to minimize the resistance to liquid flow from the supply duct into passage 15.

An annular bearing ring 27 is carried by body 12 circumferentially of passage 15 adjacent the connection of sleeve 14 to stator housing 13. A second annular bearing ring 28 is carried by the stator housing circumferentially of liquid discharge opening 19. Preferably both bearing rings are fabricated of phenol formaldehyde resin. The inner diameters of the respective bearing rings are such that they, in conjunction with the diameter of plug aperture 17, define an imaginary cone having straight sides and increasing in diameter proceeding upwardly through the fountain head: the axis of the cone coincides with the axis of passage 15.

A stream-forming fountain nozzle unit 30 is mounted to the upper end of stem 18 above body 12. The nozzle unit may be in accord with the disclosures of my prior Patent 3,081,036, if desired. Those skilled in the art, however, will understand that a flared stream deflecting head of the type shown for example, in my prior Patents 2,589,942 and 2,639,191, may be used in lieu of nozzle unit 30 is desired.

A paramagnetic, and preferably a ferromagnetic, member 35 is carried by stem 18 between annular bearing rings 27 and 28. Paramagnetic member 35 is a cylindrical member which has an outer diameter greater than the diameter of the stem and which extends circumferentially of the stem. The paramagnetic member is abutted at opposite ends by fairings 36. It is within the scope of this invention, however, that the paramagnetic member may form a portion of the length of the stem. Adjacent the paramagnetic member, the walls of passage 15 are tapered upwardly and outwardly, as at 37, to provide clearance between the walls of the passage and the paramagnetic member when the stem is pivoted in plug 16 to engage the inner surfaces of bearing elements 27 and 28. A permanent magnet may be used in place of member 35, if desired.

An annular chamber 40 is defined by stator housing 13 concentric to passage 15. Chamber 40 is separated from passage 15, however, by a cylindrical wall 41 formed by the stator housing. A plurality of magnetic core elements 42 are disposed in chamber 40 at equally spaced intervals circumferentially of passage 15. Each core element is provided with a winding 43 of electrically conductive wire; the respective coils form a portion of the energization mechanism for the respective cores. Only the energization mechanisms for the cores which occupy the three o'clock and six o'clock positions in FIG. 2 are illustrated in order that the accompanying drawings may be simplified. The cores and their windings preferably are embedded in potting material (not shown) which fills chamber 40 around the cores and the windings.

As shown with respect to the cores and coils which occupy the three o'clock and six o'clock positions in FIGURE 2 relative to stem 18 and paramagnetic member 35, each coil 43 is connected through stator housing 13 to an input conductor 45 and a return conductor 46. The return conductor includes a secondary winding 47 of a transformer 48 having its primary winding 49 connected across input terminals 50. A motor 51, having a rotatable output shaft 52, is also connected across the input terminals. Motor shaft 52 is connected to the input of a gear box 53 which defines a desired speed step-up or speed step-down ratio. The gear box has a rotary output shaft 54 connected to the shaft of a rotary switch 55 which has a plurality of contacts 56 corresponding in number to the number of coil-core units in chamber 40. The rotary switch has a wiper 57 conductively connected to the secondary of transformer 48. Successive ones of coils 43 have their input conductors 45 connected to successive ones of switch contacts 56 as wiper 57 sweeps contacts 56.

When power is applied both to transformer 48 and to motor 51, coils 43 in chamber 40 of the stator housing are successively energized. Because of the manner in which the coils are connected to switch 55, it will be seen that the progression of energization of the coils precedes circumferentially of fluid flow passage 15. Accordingly, successive ones of cores 42 are magnetized and exert an attractive effect on paramagnetic member 35. The attraction existing between a given one of cores 42 and paramagnetic member 35 causes stem 18 to pivot about a fulcrum point at plug 16 toward the magnetized core. The limits of pivotal motion of the stem are defined by bearing members 27 and 28. Because the cores are magnetized succesively progressing around passage 15, the stem is caused to gyrate in the body, i.e., the paramagnetic member is caused to move in a circular path within the fountain head body. The speed at which the stem is caused to gyrate in the body is directly related to the rotational velocity of the wiper of switch 55, and this velocity is determinable at will merely by selecting a suitable motor and gear box combination. All electrical connections between stator housing 13 and switch 15 are suitably waterproofed. Preferably the motor, the transformer, the gear box, and the associated equipment are disposed in a waterproof housing adjacent the fountain in which head 10 is used. It will be realized, however, that the coil energization mechanism described above is merely exemplary of several ways in which the coils may be energized, and thus this invention is not restricted to the apparatus illustrated. For example, it is within the scope of this invention that a solid-state device may be used to control the order and frequency of coil/core energization.

As stem 18 revolves about the limits of water discharge opening 19, the stem causes the stream of water exiting from the passage to be broken into discrete droplets of solid water, i.e., into non-aerated droplets.

The apparatus described above is in accord with my prior Patent 2,589,942 in that stem 18 is pivotally mounted to the body of the fountain head at a location spaced along passage 15 from water outlet opening 19. It is within the scope of this invention, however, that the stem may be pivotally mounted to the body at a point adjacent the discharge opening of passage 15, as is shown in my prior Patent 2,909,326, for example.

The water discharge device described above has the feature that it provides the same discharge characteristics as the devices according to any one of the above-mentioned patents, but is not dependent for its successful operation upon the action of the liquid passing through the device upon the stem. Accordingly, the apparatus described above may be constructed of any size and the moving parts thereof can have any weight desired or necessary. If desired, however, such viscously created shear forces acting tangentially of the stem may be used to supplement the gyratory action provided by the above described apparatus.

While the invention has been described above in conjunction with specific apparatus, this has been done merely to set forth a presently preferred embodiment of the invention. Modifications and alterations may be made to this apparatus without departing from the scope of the present invention. Accordingly, the foregoing description is not to be regarded as limiting the scope of this invention.

What is claimed is:

1. A liquid discharge device comprising a hollow tubular body adapted for connection to a liquid supply duct for liquid flow thereinto, one end of the body being open, a stem arranged longitudinally in the body to extend from the open end of the body and within the body away from the open end thereof, means supporting the stem relative to the body at a first location within the length of the body for free pivotal movement of the stem about the first location, annular bearing means cooperating between the stem and the body and spaced from the stem supporting means for defining limits of pivotal movement of the stem and against which the stem bears at said limits, and stem drive means operatively coupled between the body and the stem at a second location spaced along the stem from the first location for moving the stem at said second location in a circular path at a rate insufficient to produce significant vibration of the stem, the movement of the stem being independent of the action on the stem of any liquid flowing through the body around and along the stem and during which movement the stem pivots about said first location, the only effect of operation of the stem drive means on liquid flowing through the body being that produced by movement of the stem.

2. A liquid discharge device comprising a hollow tubular body having an axis and adapted adjacent one end thereof for connection to a liquid supply duct for the flow of liquid axially through the body, one end of the body being open for the discharge of liquid therefrom, a stem arranged longitudinally in the body to extend from the open end of the body and within the body away from the open end thereof, means supporting the stem relative to the body at a first location within the length of the body and on said axis for free pivotal movement of the stem about the first location, bearing means in the body exposed to the interior of the body and spaced along the body from the stem supporting means for defining limits of pivotal movement of the stem and against which the stem bears at said limits, and stem drive means operatively coupled between the body and the stem at a second location spaced along the stem from the first location for causing the stem at said second location to orbit the axis of the body at a rate insufficient to produce significant vibration of the stem, the movement of the stem in response to operation of the stem drive means being independent of the action on the stem of any liquid flowing through the body around and along the stem, the only effect of operation of the stem drive means on liquid flowing through the body being that produced by movement of the stem.

3. A liquid discharge device comprising a hollow tubular body having an axis and adapted adjacent one end thereof for connection to a liquid supply duct, one end of the body being open for the discharge of liquid therefrom, a stem arranged longitudinally in the body to extend from said other end of the body and within the body away from the open end thereof, means supporting the stem relative to the body at a first location of the stem within the body and on said axis for free pivotal movement of the stem about the first location, bearing means in the body exposed to the interior of the body and spaced along the body from the stem supporting means for defining limits of pivotal movement of the stem and against which the stem bears at said limits, an opening into the interior of the body from the exterior thereof for the flow of liquid therethrough into the body, and stem drive means operatively coupled between the body and the stem at a second location spaced along the stem from the first location for causing the stem at said second location to orbit the axis of the body independent of the action on the stem of any liquid flowing through the body around and along the stem at a rate insufficient to produce significant vibration of the stem, the only effect of operation of the stem drive means on liquid flowing through the body being that produced by movement of the stem.

4. A liquid discharge device comprising a hollow tubular body adapted adjacent one end thereof for connection to a liquid supply duct, the other end of the body being open for the discharge of liquid therefrom, a stem arranged longitudinally in the body to extend from end to end of the body and to extend from the open end of the body, means supporting the stem relative to the body at a location spaced from the open end of the body for free pivotal movement of the stem about said location, annular bearing means in the body exposed to the interior of the body and spaced from said location toward the open end of the body defining limits of pivotal movement of the stem and against which the stem bears at said limits, an opening into the interior of the body from the exterior thereof for the flow of liquid therethrough into the body, and means operatively coupled between the body and the stem for pivoting the stem about said location independent of the action on the stem of any liquid flowing through the body around and along the stem at a rate insufficient to produce significant vibration of the stem, the only effect of operation of the stem drive means on liquid flowing through the body being that produced by movement of the stem.

5. In a liquid discharge device including a hollow tubular body having an axis and adapted adjacent one end thereof for connection to a liquid supply duct, the other end of the body being open for the discharge of liquid therefrom, a stem arranged longitudinally in the body to extend from end to end of the body and to extend from the open end of the body, means supporting the stem relative to the body at a location spaced from the open end of the body for free pivotal movement of the stem about said location, and annular bearing means in the body exposed to the interior of the body and spaced from said location toward the open end of the body defining limits of pivotal movement of the stem and against which the stem bears at said limits, an opening into the interior of the body from the exterior thereof for the flow of liquid therethrough into the body, the improvement comprising stem drive means operatively coupled to the stem for pivoting the stem about said location at a rate insufficient to produce significant vibration of the stem and independently of the action on the stem of any liquid flowing through the body around and along the stem, the stem drive means including a paramagnetic member fixed to the stem at a second location spaced from the first location toward the open end of the body and within the length of the body, and means for producing a magnetic field which rotates about the axis adjacent the paramagnetic member.

6. Apparatus according to claim 5 wherein the means for producing the magnetic field includes a ferromagnetic core mounted in the body opposite the paramagnetic member, and selectively operable means for magnetizing the core.

7. Apparatus according to claim 5 wherein the means for producing the magnetic field includes a plurality of ferromagnetic cores mounted to the body at regularly spaced intervals circumferentially of the body, a winding for each core, and means for successively energizing the windings.

8. In a liquid discharge device including a hollow tubular body adapted adjacent one end thereof for connection to a liquid supply duct, one end of the body being open for the discharge of liquid therefrom, a stem arranged longitudinally in the body to extend from the open end of the body and within the body away from the open end thereof, means supporting the stem relative to the body at a first location within the length of the body for free pivotal movement of the stem about the first location, annular bearing means in the body exposed to the interior of the body and spaced from the stem supporting means for defining limits of pivotal movement of the stem and against which the stem bears at said limits, and an opening into the interior of the body from the exterior thereof for the flow of liquid therethrough into the body, the improvement comprising stem drive means operatively coupled to the stem at a second location spaced along the stem from the first location for moving the stem at the second location in a circular path at a rate insufficient to produce a significant vibration of the stem and independently of the action on the stem of any liquid flowing through the body around and along the stem, the stem drive means including a paramagnetic member fixed to the stem in spaced relation to the first location, and means for producing a magnetic field which moves around the stem adjacent the paramagnetic member.

References Cited
UNITED STATES PATENTS

| | | | |
|---|---|---|---|
| Re. 25,744 | 3/1965 | Drayer | 239—4 |
| 2,194,410 | 3/1940 | Svenson. | |
| 2,589,942 | 3/1952 | Hruby | 239—382 |
| 2,960,314 | 11/1960 | Bodine. | |
| 3,081,036 | 3/1963 | Hruby | 239—17 |
| 3,108,749 | 10/1963 | Drayer et al. | 239—4 |
| 3,175,767 | 3/1965 | Hruby | 239—17 |

M. HENSON WOOD, JR., *Primary Examiner.*

VAN C. WILKS, *Examiner.*